(12) United States Patent
Hsieh (10) Patent No.: US 7,938,563 B2
(45) Date of Patent: May 10, 2011

(54) PORTABLE COMPUTER AND KEYBOARD ILLUMINATING DEVICE THEREOF

(75) Inventor: Ching-Yao Hsieh, Taipei (TW)

(73) Assignee: Asustek Computer Inc., Taipei (TW)

( * ) Notice: Subject to any disclaimer, the term of this patent is extended or adjusted under 35 U.S.C. 154(b) by 303 days.

(21) Appl. No.: 12/352,701

(22) Filed: Jan. 13, 2009

(65) Prior Publication Data
US 2009/0257228 A1    Oct. 15, 2009

(30) Foreign Application Priority Data

Apr. 15, 2008  (TW) ................................ 97113560 A (51) Int. Cl.
*G09G 5/00* (2006.01)
(52) U.S. Cl. ............ 362/276; 362/253; 362/23; 362/85; 362/285; 362/802; 345/168; 361/679.09
(58) Field of Classification Search ..................... 362/23, 362/85, 253, 276, 285, 802; 361/679.09; 345/168
See application file for complete search history.

(56) References Cited

U.S. PATENT DOCUMENTS

| | | | | |
|---|---|---|---|---|
| 6,161,944 | A * | 12/2000 | Leman | 362/276 |
| 6,385,039 | B1 * | 5/2002 | Chiang et al. | 361/679.09 |
| 6,535,378 | B1 * | 3/2003 | Oguchi et al. | 361/679.55 |
| 6,561,668 | B2 * | 5/2003 | Katayama et al. | 362/85 |
| 7,717,607 | B2 * | 5/2010 | Harris et al. | 362/633 |
| 2005/0110761 | A1 | 5/2005 | Minaguchi et al. | |
| 2008/0174270 | A1 * | 7/2008 | Serna | 320/111 |

FOREIGN PATENT DOCUMENTS

| | | |
|---|---|---|
| CN | 2550975 | 5/2003 |
| CN | 2766349 | 3/2006 |
| WO | WO 02/11405 A1 | 2/2002 |

* cited by examiner

*Primary Examiner* — Stephen F Husar
*Assistant Examiner* — James W Cranson
(74) *Attorney, Agent, or Firm* — Alan Kamrath; Kamrath & Associates PA (57) ABSTRACT

A keyboard illuminating device for a portable computer includes a battery module and an illuminating module. The battery module can supply power to the portable computer and includes a housing. The illuminating module is disposed on the battery module and is powered by the battery module to illuminate a keyboard of the portable computer. The illuminating module hides in the battery module when the keyboard illuminating device is in a first status, and the illuminating module protrudes from a surface of the battery module when the keyboard illuminating device is in a second status.

18 Claims, 7 Drawing Sheets

PORTABLE COMPUTER AND KEYBOARD ILLUMINATING DEVICE THEREOF

BACKGROUND OF THE INVENTION

1. Field of the Invention

The invention relates to a keyboard illuminating device and, more particularly, to a keyboard illuminating device of a portable computer that consists of a battery module and an illuminating module.

2. Description of the Related Art

Since a notebook computer can be conveniently carried and used and meet the requirement of work, study, leisure or exhibition, it is very popular. When a user needs to use the notebook computer in the dark or indoors, he often cannot recognize the position of each key of the keyboard of the notebook computer because of the insufficient ambient light and then inputs error commands, which causes the user trouble. Therefore, many auxiliary illuminating designs for the keyboard are provided.

Conventional keyboard illuminating devices can be divided into two types, namely the external connection mode or the built-in mode. The external keyboard illuminating device is connected to the expansion interface slot of the notebook computer to obtain the electricity to illuminate the keyboard. The conventional technology such as Taiwan patent publication No. 523237, entitled "illuminating device for notebook computer", discloses an illuminating device connected to a PCMCIA interface slot of a notebook computer and for illuminating a keyboard. This type of device is independent of the notebook computer, needs to be additionally carried when a user travels and occupies the space in use. The built-in keyboard illuminating device is assembled to the housing of the notebook computer to save the space. The conventional technology such as Taiwan patent publication No. M286948, entitled "mobile computer having hidden auxiliary illuminating device", discloses a keyboard illuminating device disposed on the housing around the screen of a notebook computer, and the keyboard illuminating device can be received in the housing in normal times and be pulled out to illuminate the keyboard when used. This type of illuminating device may obstruct the view of the user because of its disposal height, and the light may project on the screen of the computer and then cause a light reflecting effect.

Therefore, to solve the above conventional problem, the invention is provided.

BRIEF SUMMARY OF THE INVENTION

The objective of the invention is to provide a keyboard illuminating device combined with the battery module of a portable computer to save space and facilitate the input of a user via a keyboard in the dark.

To achieve the above objective, the keyboard illuminating device of the portable computer of the invention includes a battery module and an illuminating module. The battery module is used to supply power to the portable computer and includes a housing. The illuminating module is disposed on the battery module and illuminates a keyboard of the portable computer via the power supplied by the battery module. When the keyboard illuminating device is in a first status, the illuminating module hides in the battery module, and when the keyboard illuminating device is in a second status, the illuminating module protrudes from a surface of the battery module.

In one embodiment of the invention, when the illuminating module of the keyboard illuminating device of the portable computer hides in the housing of the battery module, the illuminating module is located at a receiving position. After the illuminating module moves from the receiving position to a start position, the battery module can supply the power to the illuminating module. Therefore, the illuminating module can be easily started, and the space occupied by the illuminating module can be saved to allow the portable computer to be easily packed away.

In another embodiment of the invention, the keyboard illuminating device of the portable computer can be detachably assembled to the body. When the keyboard illuminating device is disassembled from the portable computer, the illuminating module also can be started to provide an additional illuminating function. The keyboard illuminating device can be disassembled from the portable computer as a portable illuminating module. The battery module can supply sufficient electricity to the illuminating module, thereby avoiding the trouble of frequently disassembling and assembling the battery module.

The portable computer of the invention includes a body and a keyboard illuminating device. The body includes a keyboard. The keyboard illuminating device can be assembled to the body and includes a battery module and an illuminating module. The battery module is used to supply power to the body and includes a housing. The illuminating module is disposed on the battery module and illuminates the keyboard via the power supplied by the battery module.

In the invention, the keyboard illuminating device is used to illuminate the keyboard that is used in a condition without sufficient light, and the disposal position of the illuminating module cannot cause the light reflecting effect. The illuminating module can hide in the portable computer to obtain a good receiving effect.

BRIEF DESCRIPTION OF THE SEVERAL VIEWS OF THE DRAWINGS

FIG. 2(*a*) and FIG. 2(*b*) are partial schematic diagrams showing the keyboard illuminating device of the portable computer of an embodiment of the invention in a first status and a second status;

FIG. 3(*a*) and FIG. 3(*b*) are schematic diagrams showing actions of the keyboard illuminating device of the portable computer of an embodiment of the invention in a first status and a second status;

DETAILED DESCRIPTION OF THE EMBODIMENTS

These and other features, aspects, and advantages of the present invention will become better understood with regard to the following description, appended claims, and accompanying drawings.

Figure 1:
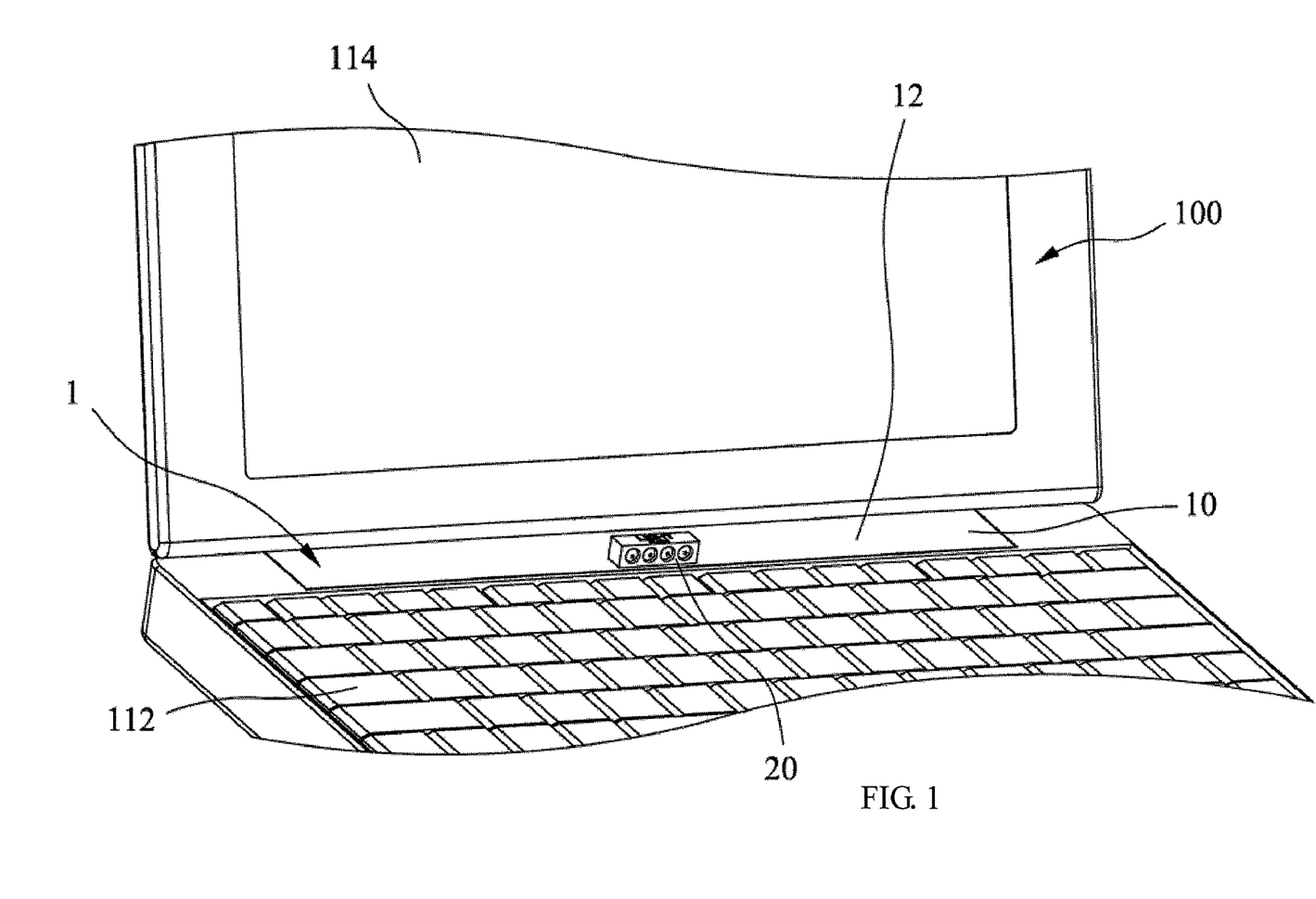
FIG. 1 is a schematic diagram showing the structure of a keyboard illuminating device of a portable computer of one embodiment of the invention.

Please refer to FIG. 1. FIG. 1 is a schematic diagram showing the structure of a keyboard illuminating device of a portable computer of one embodiment of the invention. As shown in FIG. 1, a keyboard illuminating device 1 includes a battery module 10 and an illuminating module 20. The battery module 10 is used to supply power to a portable computer 100, and it includes a housing 12. The illuminating module 20 is disposed on the battery module 10, and it illuminates a keyboard 112 of the portable computer 100 via the power supplied by the battery module 10.

When a user wants to use the portable computer 100 in the dark, he can start the illuminating module 20 to illuminate the keyboard 112. Since the disposal position of the illuminating module 20 is low, the illuminating module 20 can directly illuminate the keyboard 112 and does not cause a light reflecting effect to occur on a screen 114. Furthermore, the illuminating module 20 does not obstruct the view of the user. In one embodiment of the invention, the illuminating module 20 consists of a plurality of LED lamps to provide a good illuminating effect, and the illuminating module 20 also may be a bulb or other illuminating element and is not limited in the invention.

Figures 2A, 2B:
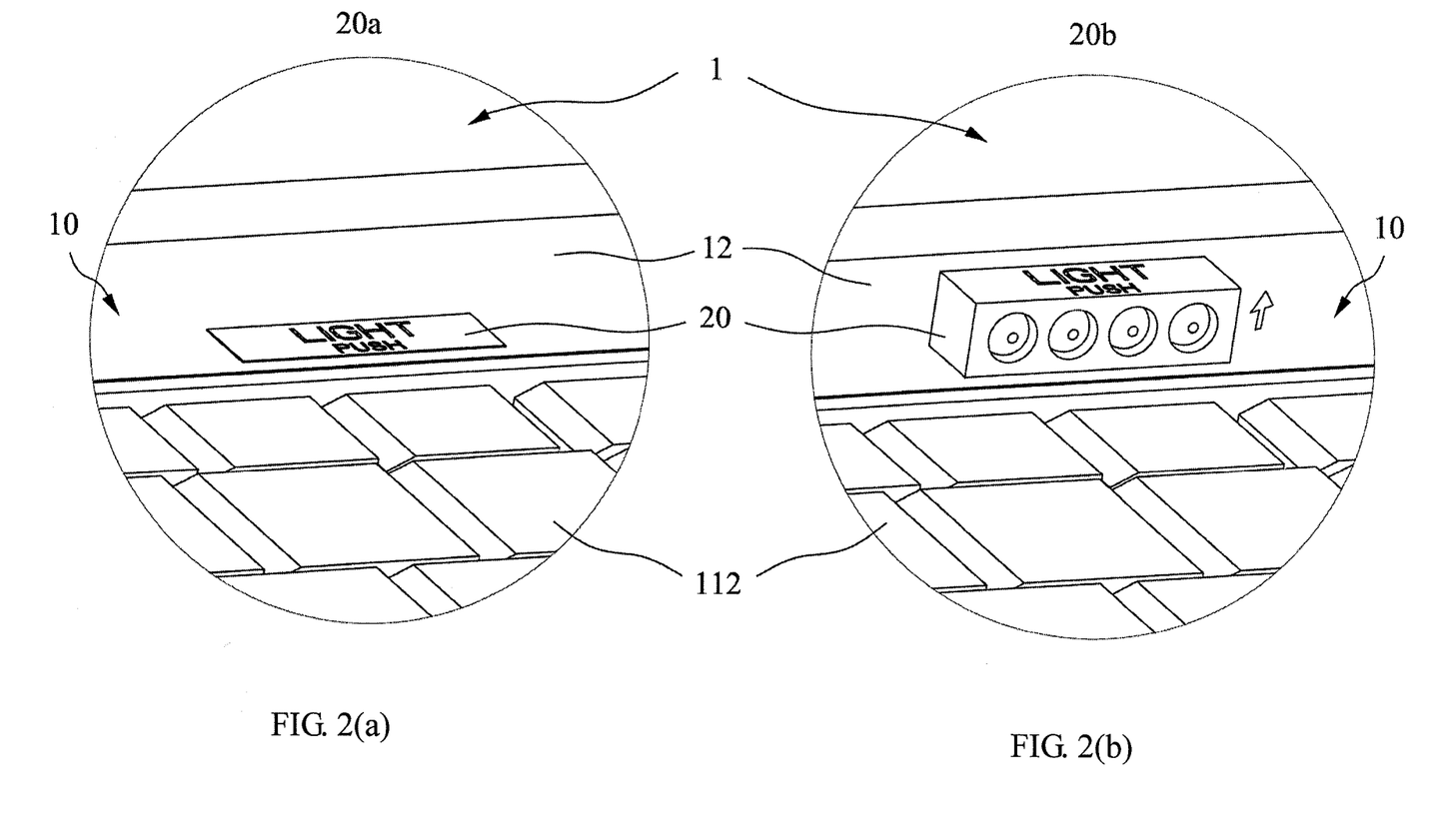
Figure 3A:
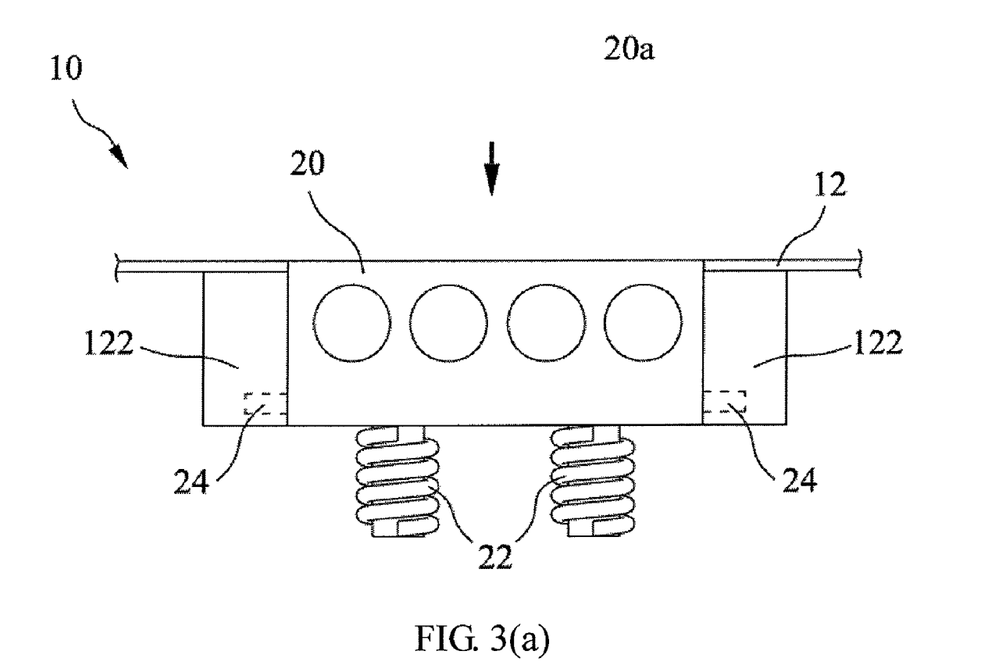
Figure 3B:
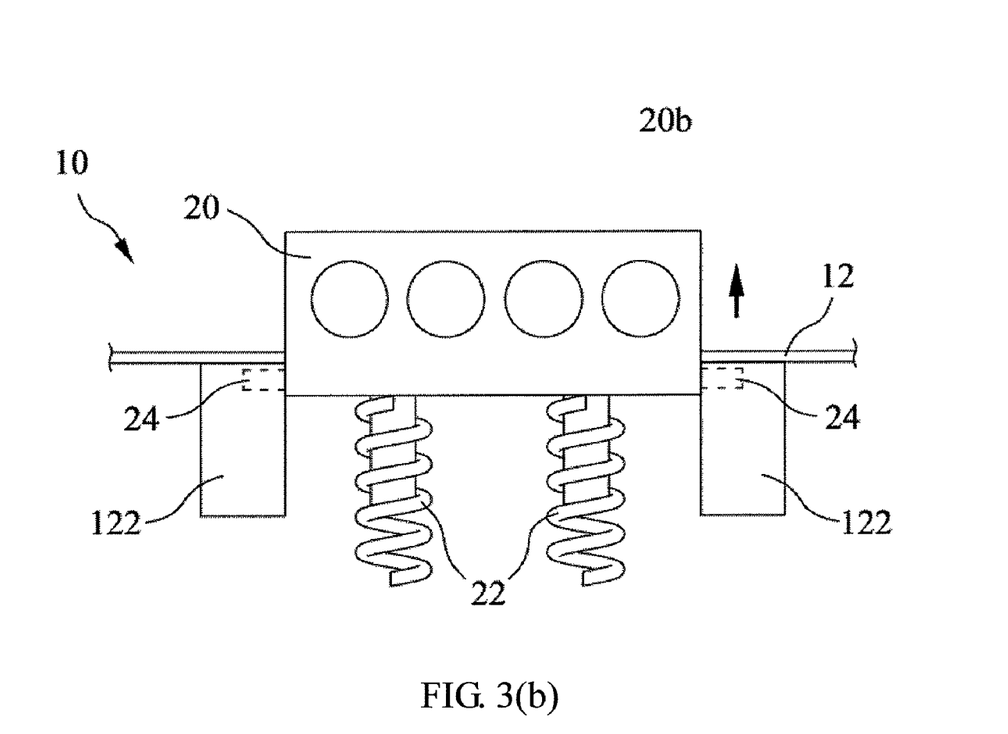

As shown in FIG. 2(a), FIG. 2(b), FIG. 3(a) and FIG. 3(b), they show statuses of the keyboard illuminating device of the portable computer in one embodiment of the invention. FIG. 2(a) and FIG. 2(b) are partial schematic diagrams showing the keyboard illuminating device of the portable computer of an embodiment of the invention in a first status and a second status. FIG. 3(a) and FIG. 3(b) are schematic diagrams showing actions of the keyboard illuminating device of the portable computer of an embodiment of the invention in a first status and a second status. As shown in FIG. 2(a) and FIG. 2(b), the illuminating module 20 hides in the battery module 10 when the keyboard illuminating device 1 is in a first status. The illuminating module 20 protrudes from a surface of the battery module 10 when the keyboard illuminating device 1 is in a second status, and at that moment, the battery module 10 can provide power for the illuminating module 20 to illuminate the keyboard 112.

As shown in FIG. 3(a) and FIG. 3(b), in one embodiment of the invention, the illuminating module 20 is an ejection structure, and it includes an elastic member 22 and a fastener 24. When the illuminating module 20 is not started, the keyboard illuminating device 1 is in the first status that the illuminating module 20 is received in the housing 12 of the battery module 10. That is, the illuminating module 20 is located at a receiving position 20a. At that moment, the elastic member 22 of the illuminating module 20 is compressed, and the fastener 24 and the fastening structure 122 of the housing are cooperated to fix the illuminating module 20. The illuminating module 20 that is received and the housing 12 are at the same plane to save the usage space and increase the overall beauty, and the portable computer can be packed away without being affected by the illuminating module 20.

When a user wants to use the illuminating module 20, he can press the illuminating module 20 to allow the fastener 24 to separate from the fastening structure 122, and then the illuminating module 20 is ejected from the receiving position 20a to a start position 20b via the elastic restoring force. At that moment, the keyboard illuminating device 1 is changed to be in the second status, and the switch (not shown) of the illuminating module 20 is enabled to allow the battery module 10 to supply power to the illuminating module 20. When the user needn't use the illuminating module 20, he can press the illuminating module 20 again to make the illuminating module 20 change from the start position 20b to the receiving position 20a, and the power of the illuminating module 20 is off at that moment.

The illuminating module 20 also can be designed to be other structure that can move between the receiving position 20a and the start position 20b to control the power supplied to the illuminating module 20. For example, the illuminating module 20 may be a structure that has a runner for pulling out the illuminating module 20 or can eject by pressing a preinstall button, and it is not limited to the embodiment.

Figure 4:
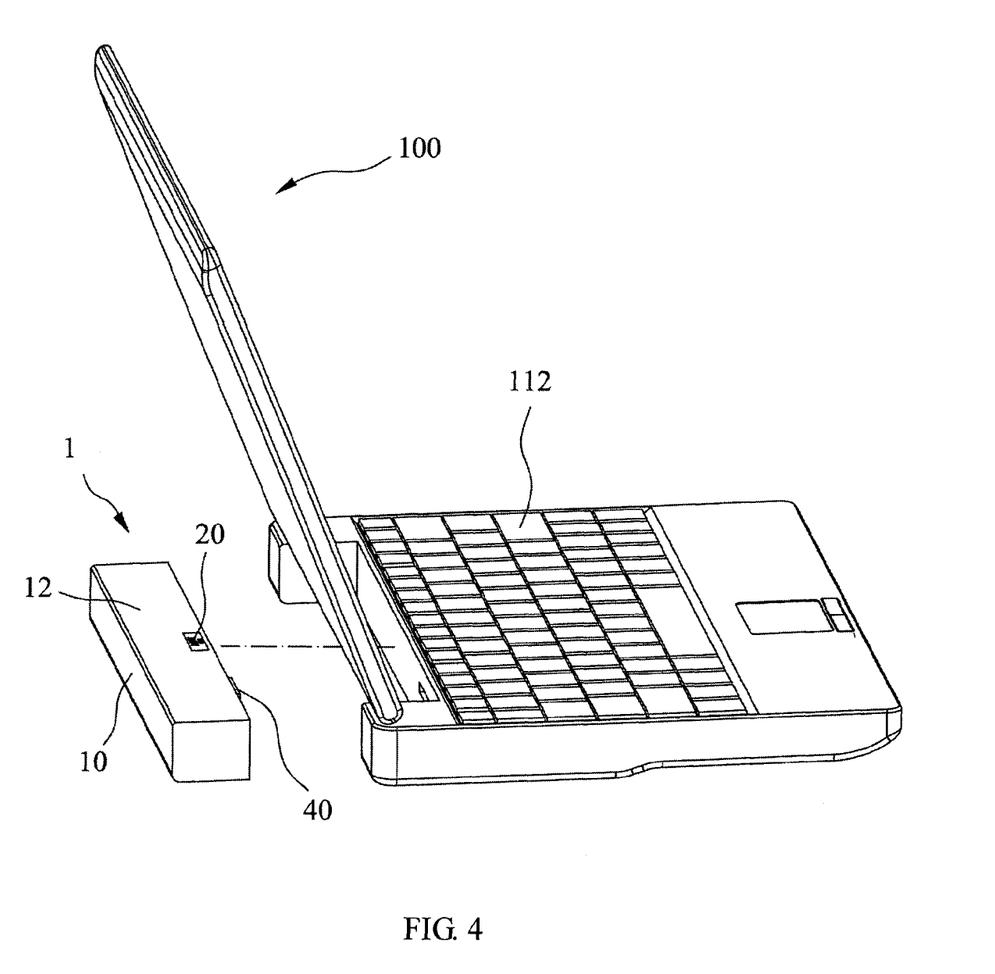
FIG. 4 is a schematic diagram showing the keyboard illuminating device of the portable computer of an embodiment of the invention in another status.

Please refer to FIG. 4. FIG. 4 is a schematic diagram showing the keyboard illuminating device of the portable computer of an embodiment of the invention in another status. As shown in FIG. 4, the keyboard illuminating device 1 of the portable computer of the embodiment of the invention is detachably assembled to the portable computer 100. When the keyboard illuminating device 1 is disassembled from the portable computer 100, the illuminating module 20 also can be started to provide an additional illuminating function. Generally, when the keyboard illuminating device 1 is assembled to the portable computer 100, the battery module 10 can supply power to the portable computer 100, and the illuminating module 20 can illuminate the keyboard 112.

In a power failure condition or the outdoor, a user can disassemble the keyboard illuminating device 1 from the portable computer 100 and start the illuminating module 20 as a portable illuminating module, and then the keyboard illuminating device 1 can independently perform an illuminating function as a flashlight does. The electricity needed by the illuminating module 20 can be sufficiently supplied by the battery module 10. When the battery module 10 is in a fully charged state, it can provide the power for the illuminating module 20 to illuminate for several tens of hours, which further facilitates the usage.

In one embodiment of the invention, the keyboard illuminating device 1 is connected to the portable computer 100 via a connecting interface 40 to supply power to the portable computer 100.

Figure 5:
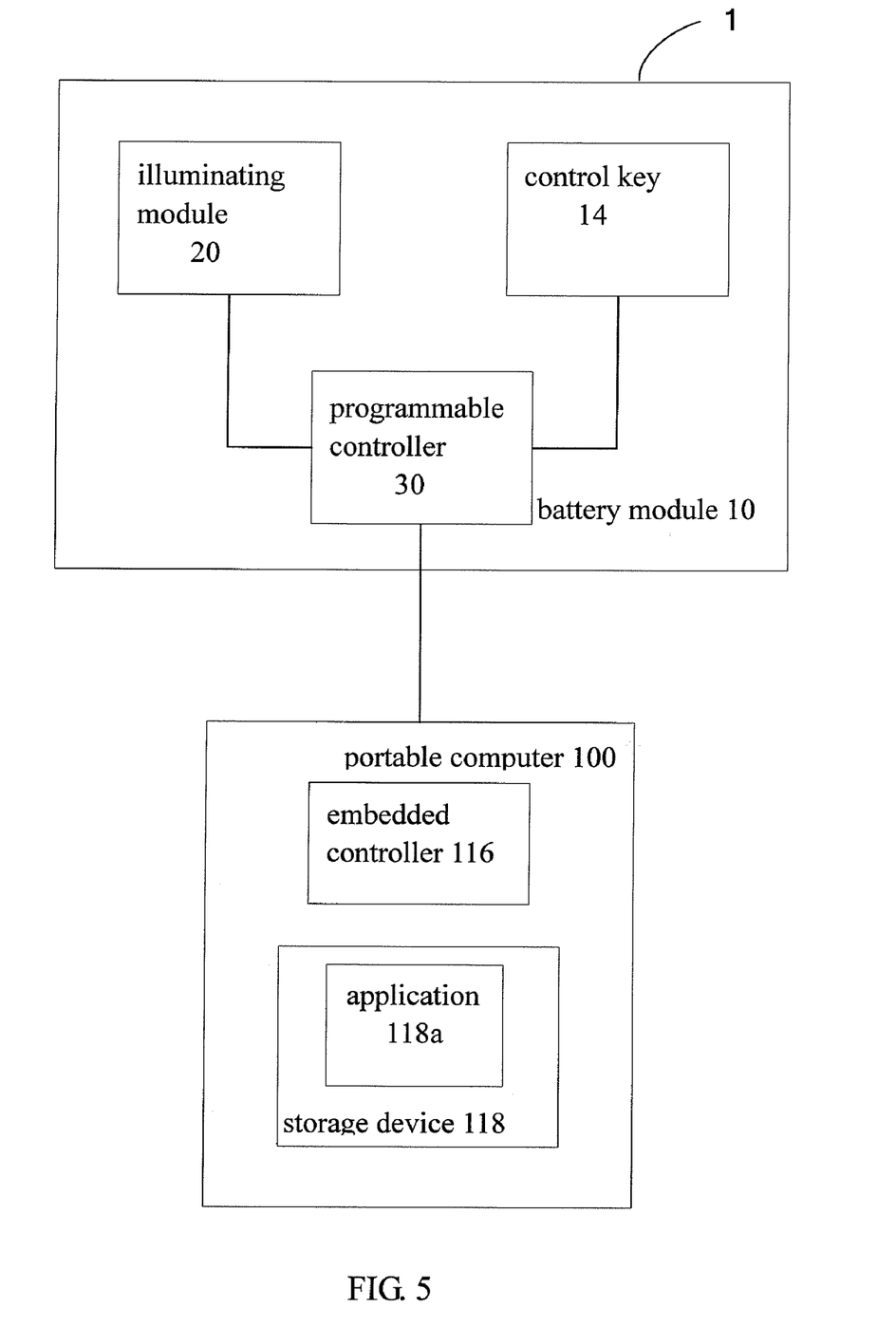
FIG. 5 is a block diagram showing the circuit of the keyboard illuminating device of the portable computer of an embodiment of the invention.

Please refer to FIG. 5. FIG. 5 is a block diagram showing the circuit of the keyboard illuminating device of the portable computer of an embodiment of the invention. As shown in FIG. 5, the keyboard illuminating device 1 further includes a programmable controller 30 disposed in the battery module 10. When the keyboard illuminating device 1 is connected to the portable computer 100, the programmable controller 30 is electrically connected to an embedded controller 116 of the portable computer 100. In other embodiment, the programmable controller 30 may be replaced with a microprocessor, the embedded controller 116 also may be replaced with a north bridge chip, and they are not limited in the invention.

The user can control the embedded controller 116 and the programmable controller 30 via an application 118a in the storage device 118 of the portable computer 100 to control the color and brightness of the lamplight radiated by the illuminating module 20.

The battery module 10 further includes a control key 14. When the keyboard illuminating device 1 is disassembled to be independently used, the user can start the programmable controller 30 via the control key 14 on the battery module 10 to control the luminous mode (for example, the illuminating module 20 may radiate the light directly, flash or send out a SOS sign) and/or brightness of the illuminating module 20.

Figure 6:
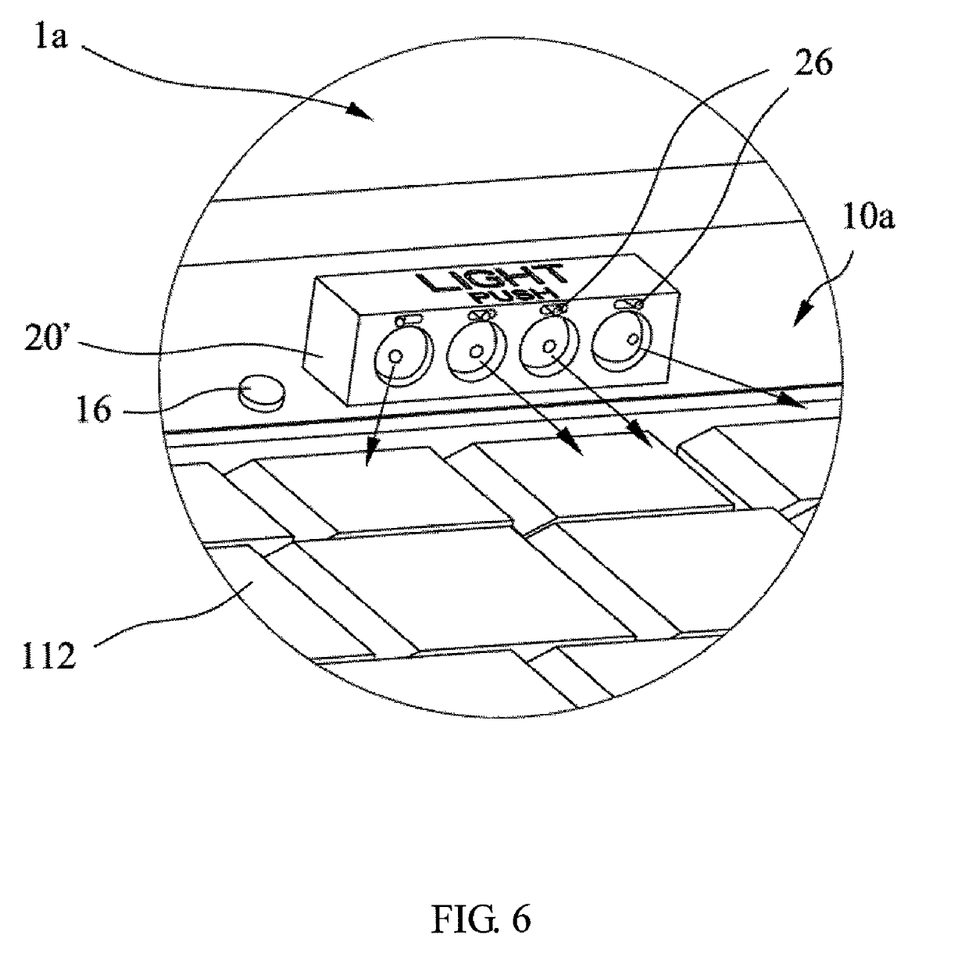
FIG. 6 is a partial schematic diagram showing the keyboard illuminating device of the portable computer of an embodiment of the invention.

Please refer to FIG. 6. FIG. 6 is a partial schematic diagram showing the keyboard illuminating device of the portable computer of an embodiment of the invention. As shown in FIG. 6, in an embodiment of the invention, besides the above mode of starting the illuminating module 20, the keyboard illuminating device 1a further includes a switch 16 for switching the power supplied to the illuminating module 20' by the battery module 10a on or off.

As shown in FIG. 6, the light projection direction of the illuminating module 20' can be adjusted via the design. The illuminating module 20' includes an adjustment device 26, and the angle of the outer housing of the corresponding lighting equipment can be changed via the adjustment device 26 to control the light projection direction of the illuminating module 20'. Via the different design of the outer housing of the lighting equipment or other structure that has a function similar to the function of the adjustment device 26, the lighting equipment can generate the light refraction effect in different directions to increase the range that the illuminating module 20' can illuminate, and the invention is not limited to the embodiment.

Figure 7:
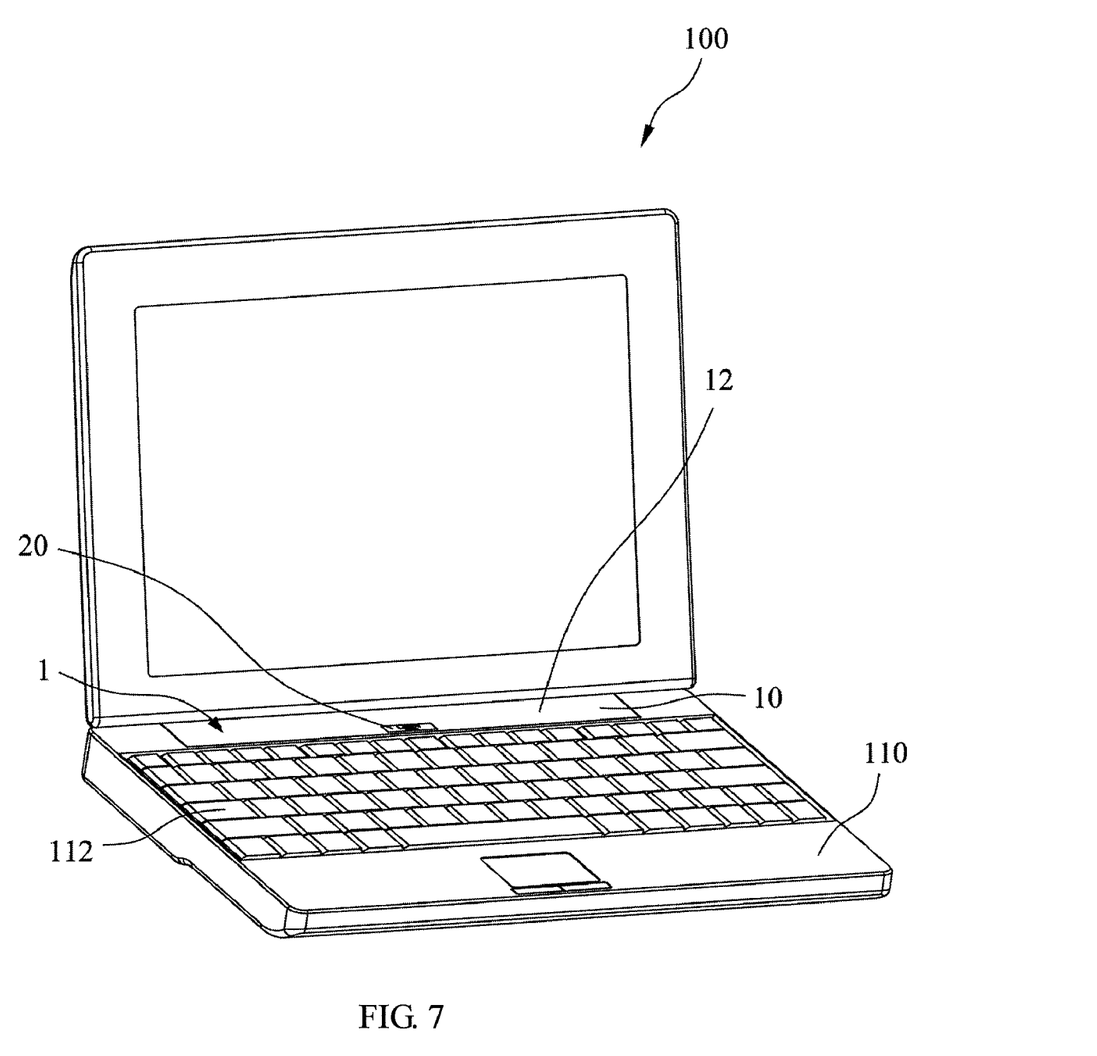
FIG. 7 is a schematic diagram showing the structure of the portable computer of an embodiment of the invention.

Please refer to FIG. 7. FIG. 7 is a schematic diagram showing the structure of the portable computer of an embodiment of the invention. As shown in FIG. 7, the portable computer 100 of the embodiment of the invention includes a body 110 and the keyboard illuminating device 1. The body 110 includes a keyboard 112. The keyboard illuminating device 1 can be assembled to the body 110 and includes the battery module 10 and the illuminating module 20. The battery module 10 is used to supply power to the body 110 and includes a housing 12. The battery module 20 is disposed on the battery module 10 and illuminates the keyboard 112 via the power supplied by the battery module 10.

When the keyboard illuminating device 1 is in the first status, the illuminating module 20 hides in the battery module 10. When the keyboard illuminating device 1 is in the second status, the illuminating module 20 protrudes from a surface of the battery module 10. Via the corporation between the illuminating module 20 and the battery module 10, the circuit and structure of the conventional keyboard illuminating module can be simplified. Since the illuminating module 20 is located at a low place adjacent to keyboard 12, the luminous effect for the keyboard 112 can be further enhanced.

In one embodiment of the invention, the portable computer 100 may be a notebook computer or other portable computer, and it is not limited. As shown in FIG. 6, the portable computer 100 of the embodiment of the invention further includes an embedded controller 116 and a storage device 118 storing an application 118a. When the keyboard illuminating device 1 is assembled to the portable computer 100, the embedded controller 16 can be electrically connected to a programmable controller 30 of the keyboard illuminating device 1. Therefore, the embedded controller 116 and the programmable controller 30 can be controlled via the application 118a to control the color or brightness of the light radiated by the illuminating module 20.

When the keyboard illuminating device 1 is disassembled to be independently used, the programmable controller 30 can be started via the control key 14 on the battery module to control the light luminous mode and/or brightness of the illuminating module 20.

Although the present invention has been described in considerable detail with reference to certain preferred embodiments thereof, the disclosure is not for limiting the scope of the invention. Persons having ordinary skill in the art may make various modifications and changes without departing from the scope and spirit of the invention. Therefore, the scope of the appended claims should not be limited to the description of the preferred embodiments described above.

What is claimed is:

1. A keyboard illuminating device of a portable computer, comprising:
    a battery module for supplying power to the portable computer and including a housing; and
    an illuminating module disposed on the battery module and illuminating a keyboard of the portable computer via the power supplied by the battery module,
    when the keyboard illuminating device is in a first status, the illuminating module is hided in the battery module, and when the keyboard illuminating device is in a second status, the illuminating module protrudes from a surface of the battery module.

2. The keyboard illuminating device according to claim 1, wherein when the keyboard illuminating device is disassembled from the portable computer, the illuminating module provides an illuminating function via the power supplied by the battery module.

3. The keyboard illuminating device according to claim 1, wherein when the illuminating module is hided in the battery module, the illuminating module is located at a receiving position.

4. The keyboard illuminating device according to claim 3, wherein when the illuminating module moves to a start position from the receiving position, the battery module is capable of supplying the power to the illuminating module.

5. The keyboard illuminating device according to claim 1, wherein the light projection direction of the illuminating module is capable of being adjusted.

6. The keyboard illuminating device according to claim 1, wherein the keyboard illuminating device further comprises a switch for determining whether the battery module supplies the power to the illuminating module.

7. The keyboard illuminating device according to claim 1, wherein the keyboard illuminating device further comprises a programmable controller disposed in the battery module, and the programmable controller is capable of being electrically connected to an embedded controller of the portable computer.

8. The keyboard illuminating device according to claim 7, wherein an application of the portable computer controls the programmable controller and the embedded controller to control the color or brightness of the lamplight of the illuminating module.

9. The keyboard illuminating device according to claim 7, wherein the battery module further comprises a control key, and the programmable controller is capable of being started via the control key to control the luminous mode and brightness of the illuminating module.

10. A portable computer comprising:
    a body including a keyboard; and
    a keyboard illuminating device capable of being assembled to the body and including:
    a battery module for supplying power to the body and including a housing; and
    an illuminating module disposed on the battery module and illuminating the keyboard via the power supplied by the battery module,
    when the keyboard illuminating device is in a first status, the illuminating module is hided in the battery module, and when the keyboard illuminating device is in a second status, the illuminating module protrudes from a surface of the battery module.

11. The portable computer according to claim 10, wherein when the keyboard illuminating device is disassembled from the portable computer, the illuminating module provides an illuminating function via the power supplied by the battery module.

12. The portable computer according to claim 10, wherein when the illuminating module is hided in the battery module, the illuminating module is located at a receiving position.

13. The portable computer according to claim 12, wherein when the illuminating module moves from the receiving position to a start position, the battery module supplies the power to the illuminating module.

14. The portable computer according to claim 10, wherein the light projection direction of the illuminating module is capable of being adjusted.

15. The portable computer according to claim 10, wherein the keyboard illuminating device further comprises a switch for determining whether the battery module supplies the power to the illuminating module.

16. The portable computer according to claim 10, wherein the keyboard illuminating device further comprises a programmable controller disposed in the battery module, and the programmable controller is capable of being electrically connected to an embedded controller of the portable computer.

17. The portable computer according to claim 16, wherein the portable computer further comprises an application and controls the programmable controller and the embedded controller via the application to control the color or brightness of the lamplight of the illuminating module.

18. The portable computer according to claim 16, wherein the battery module further comprises a control key, and the programmable controller is capable of being started via the control key to control the luminous mode and brightness of the illuminating module.

* * * * *